United States Patent
Mizobata et al.

(10) Patent No.: US 10,493,883 B2
(45) Date of Patent: Dec. 3, 2019

(54) BACK FRAME STRUCTURE OF VEHICLE SEAT

(71) Applicant: TOYOTA BOSHOKU KABUSHIKI KAISHA, Aichi-ken (JP)

(72) Inventors: Hiroshi Mizobata, Aichi-ken (JP); Hiroyuki Suzuki, Aichi-ken (JP); Fumitoshi Akaike, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 52 days.

(21) Appl. No.: 15/598,531

(22) Filed: May 18, 2017

(65) Prior Publication Data
US 2017/0341553 A1 Nov. 30, 2017

(30) Foreign Application Priority Data
May 25, 2016 (JP) .................. 2016-104017

(51) Int. Cl.
*B60N 2/64* (2006.01)
*B60N 2/68* (2006.01)
(Continued)

(52) U.S. Cl.
CPC ............ *B60N 2/68* (2013.01); *B60N 2/643* (2013.01); *B60N 2/682* (2013.01); *B60N 2/897* (2018.02);
(Continued)

(58) Field of Classification Search
CPC . B60N 2/64; B60N 2/643; B60N 2/68; B60N 2/688; B60N 2205/30; B60R 22/26; B60R 2022/1818
See application file for complete search history.

(56) References Cited

U.S. PATENT DOCUMENTS

2010/0283309 A1   11/2010 Funk et al.
2011/0163587 A1*  7/2011 Kmeid .............. B60N 2/68
                                                  297/452.2
(Continued)

FOREIGN PATENT DOCUMENTS

CN    202088941     12/2011
DE    102008053289   4/2010
(Continued)

OTHER PUBLICATIONS

Japanese Office Action in counterpart Japanese Application No. 2016-104017, dated Oct. 1, 2019 (along with English-language translation).

*Primary Examiner* — Ryan D Kwiecinski
(74) *Attorney, Agent, or Firm* — Greenblum & Bernstein, P.L.C.

(57) ABSTRACT

A back frame structure of a vehicle seat including: first and second side frames; and an upper frame that connects the first and second side frames, wherein the first side frame has a constant cross section and the second side frame has a constant cross section, wherein an outline shape of the cross section of the first side frame and an outline shape of the cross section of the second side frame are in line symmetry with respect to a centerline of the back frame in a left and right direction, and wherein a geometrical moment of inertia of the cross section of the first side frame is larger than a geometrical moment of inertia of the cross section of the second side frame.

6 Claims, 8 Drawing Sheets

(51) Int. Cl.
  *B60N 2/897* (2018.01)
  *B60R 22/26* (2006.01)
  *B60R 22/18* (2006.01)

(52) U.S. Cl.
  CPC ........... *B60N 2205/30* (2013.01); *B60R 22/26* (2013.01); *B60R 2022/1818* (2013.01)

(56) References Cited

U.S. PATENT DOCUMENTS

| | | | | |
|---|---|---|---|---|
| 2013/0140868 | A1* | 6/2013 | Muck | B23K 26/24 |
| | | | | 297/452.2 |
| 2014/0159462 | A1* | 6/2014 | Matsumoto | B60N 2/68 |
| | | | | 297/452.18 |
| 2014/0232162 | A1 | 8/2014 | Mitsuhashi | |
| 2015/0145313 | A1* | 5/2015 | Lee | B60N 2/682 |
| | | | | 297/452.18 |
| 2016/0257230 | A1* | 9/2016 | Tsuji | B60N 2/64 |
| 2016/0347223 | A1* | 12/2016 | Akaike | B60N 2/682 |
| 2017/0341552 | A1* | 11/2017 | Mizobata | B60N 2/68 |
| 2017/0341622 | A1* | 11/2017 | Mizobata | B60N 2/68 |
| 2018/0001809 | A1* | 1/2018 | Kaneda | B60N 2/68 |
| 2018/0079341 | A1* | 3/2018 | Nishimura | B60N 2/688 |
| 2018/0086241 | A1* | 3/2018 | Kimura | B60N 2/22 |

FOREIGN PATENT DOCUMENTS

| | | |
|---|---|---|
| JP | 2001-095647 | 4/2001 |
| JP | 2013-209087 | 10/2013 |
| JP | 2014-156212 | 8/2014 |

\* cited by examiner

BACK FRAME STRUCTURE OF VEHICLE SEAT

CROSS-REFERENCE TO RELATED APPLICATIONS

This application claims priority from Japanese Patent Application No. 2016-104017 filed on May 25, 2016, the entire contents of which are incorporated herein by reference.

TECHNICAL FIELD

The disclosure relates to a back frame structure of a vehicle seat to be mounted on a vehicle such as an automobile, an airplane, a ship, or a train.

BACKGROUND

As one of a back frame structure of a vehicle seat, there is a structure in which a gate-shaped back frame serving as a framework of a seat back and having a substantially inverted U shape in a front view is formed by connecting upper end sides of a pair of side frames extending in an up and down direction with an upper frame in a bridging manner. Such type of a back frame disclosed in JP-A-2014-156212 is used for a three-point seat belt built-in type vehicle seat. In the back frame structure disclosed in JP-A-2014-156212, an upper end portion of a high-strength side frame on one side to which the load from the seat belt is directly applied and an upper end portion of a normal-strength side frame on the other side are connected by the upper frame, and a belt guide is attached to the upper end portion of the high-strength side frame. The belt guide is a member that guides a webbing released from a webbing take-up device of a seat belt device disposed inside the seat back so as to extend from the back side to the front side of the back frame.

In the above structure, when it is attempted to integrate the belt guide with the upper frame in order to reduce the number of parts, it is necessary to make the upper frames of different structures in the left and right seats since the attachment position of the belt guide differs between the left and right seats. Here, even when the upper frame is made of a fiber-reinforced resin or a light alloy, and the belt guide part is formed differently on the left and right sides by using one molding die as an insert structure of a molding die, it is inevitable to make the upper frames of different structures on the left and right when the shape of the upper end portion of the high-strength side frame is different from the shape of the upper end portion of the normal-strength side frame. The reason is that the upper end portion of the high-strength side frame has to be attached to the side on which the belt guide is disposed, and thus, the portion to which the upper end portion of the high-strength side frame is attached and the portion to which the upper end portion of the normal-strength side frame is attached also have to be exchanged at the left and right.

SUMMARY

The disclosure has been made in consideration of the above problems and an object thereof is to provide a back frame structure of a vehicle seat in which the bending strength of the right and left side frames is different from each other while suppressing an increase in the kind of parts.

According to an aspect of the disclosure, there is provided a back frame structure of a vehicle seat, the back frame structure including: first and second side frames that extend in an up and down direction; and an upper frame that connects an upper end side of the first side frame and an upper end side of the second side frame in a bridging manner, wherein the first side frame has a constant cross section, which is a closed section or an opened section with a part of a closed section opened, and the second side frame has a constant cross section, which is a closed section or an opened section with a part of a closed section opened, wherein an outline shape of the cross section of the first side frame and an outline shape of the cross section of the second side frame are in line symmetry with respect to a centerline of the back frame in a left and right direction, and wherein a geometrical moment of inertia of the cross section of the first side frame is larger than a geometrical moment of inertia of the cross section of the second side frame.

Accordingly, the outline shape of the cross section of the first side frame and the outline shape of the cross section of the second side frame are in line symmetry with respect to the centerline of the back frame in the left and right direction. Therefore, both the first side frame and the second side frame are selectively attached to the left and right of the same upper frame. As a result, the same upper frame can be used even when the mounting sides of the first side frame and the second side frame in the left and right automobile seats are different at the left and right. Further, since the geometrical moment of inertia of the cross section of the first side frame is larger than the geometrical moment of inertia of the cross section of the second side frame, at least a part of the surface portions constituting the first side frame is thicker than the corresponding surface portions constituting the second side frame. In this way, the bending rigidity of the first side frame can be made higher than the bending rigidity of the second side frame. That is, it is possible to provide a structure in which the bending strength of the first and second side frames is different from each other while suppressing an increase in the kind of the upper frame.

DETAILED DESCRIPTION

FIGS. 1 to 9 show an embodiment of the disclosure. The present embodiment is an example where the disclosure is applied to a back frame (hereinafter, simply referred to as a "back frame") of an automobile seat. In each of the figures, respective directions of an automobile and an automobile seat when the automobile seat to which a back frame is attached is mounted on a floor of the automobile are indicated by arrows. In the following, the description relating to directions is made with reference to these directions.

Figure 1:
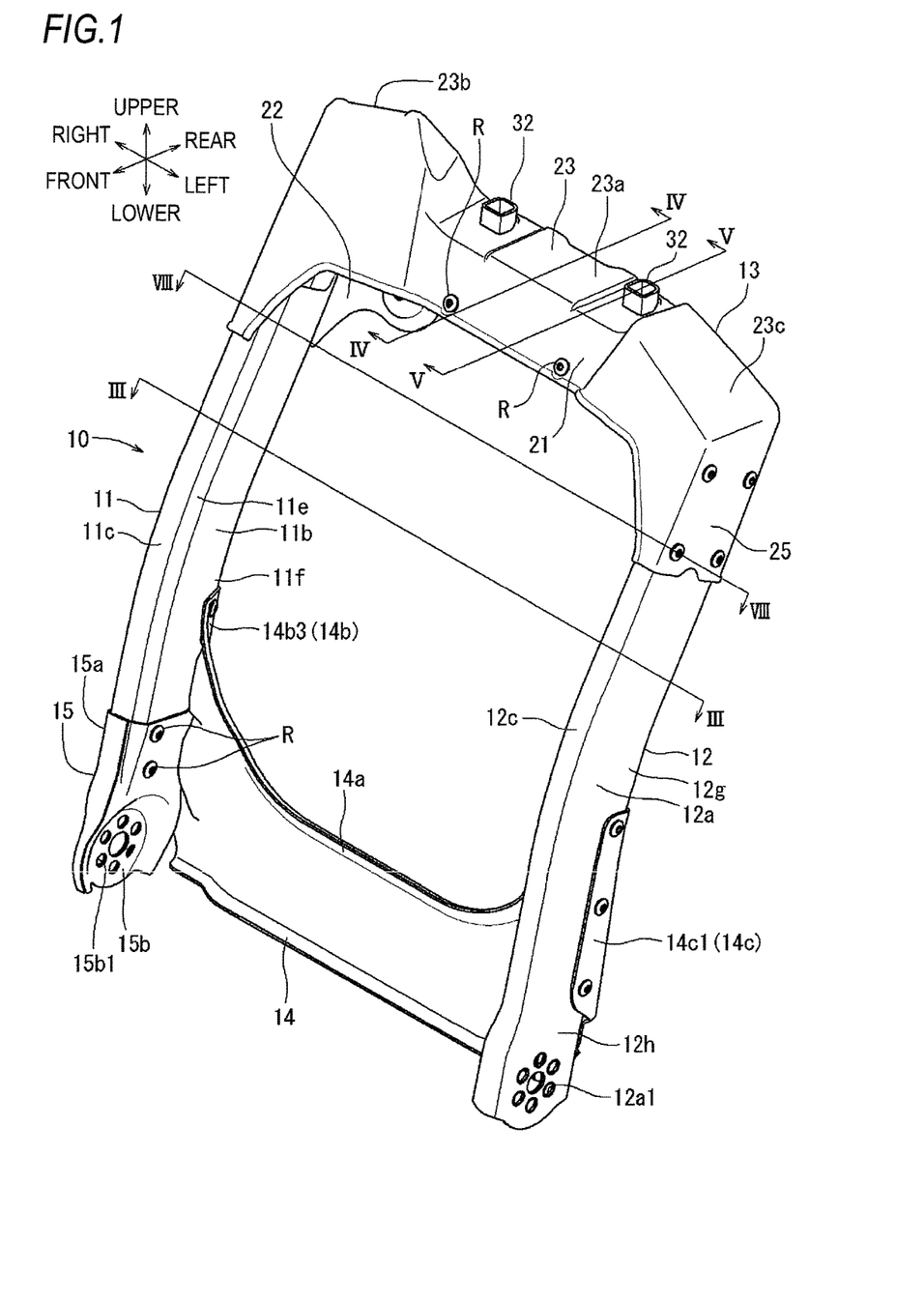
FIG. 1 is a perspective view of a back frame of a right automobile seat according to an embodiment of the disclosure.
Figure 2:
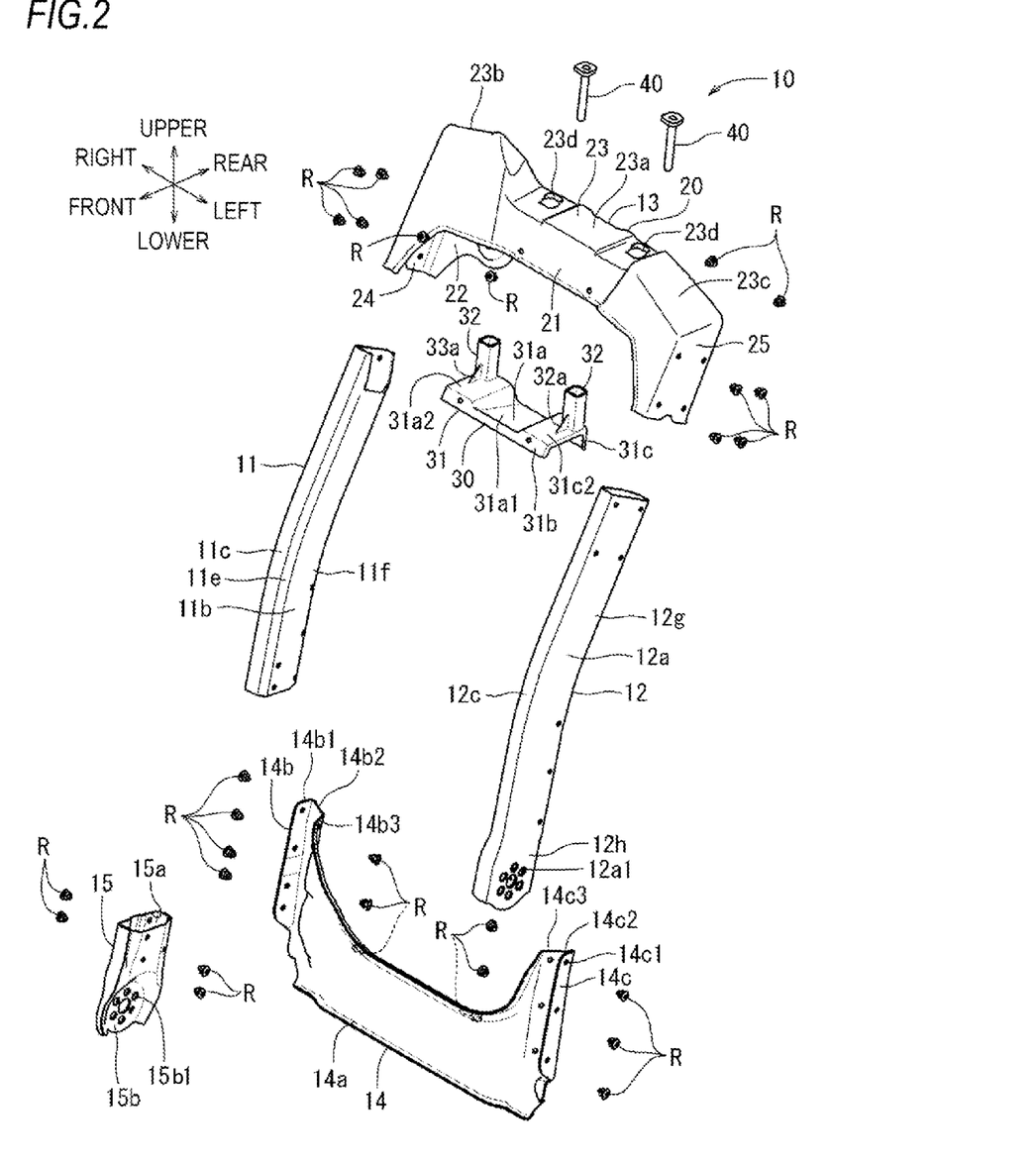
FIG. 2 is an exploded perspective view of the back frame of the above embodiment.

As shown in FIGS. 1 and 2, a back frame 10 of the present embodiment is a back frame of a right automobile seat in which a seat belt is incorporated. A webbing take-up device (not shown) of a seat belt device can be attached to the back frame 10. The back frame 10 includes a right side frame 11 extending in an up and down direction, a left side frame 12 extending in the up and down direction, an upper frame 13 connecting upper end portions of the right side frame 11 and the left side frame 12, and a lower frame 14 connecting lower end portions thereof. Here, the right side frame 11 and the left side frame 12 correspond to the "first side frame" and the "second side frame" in the claims, respectively.

Figure 3:
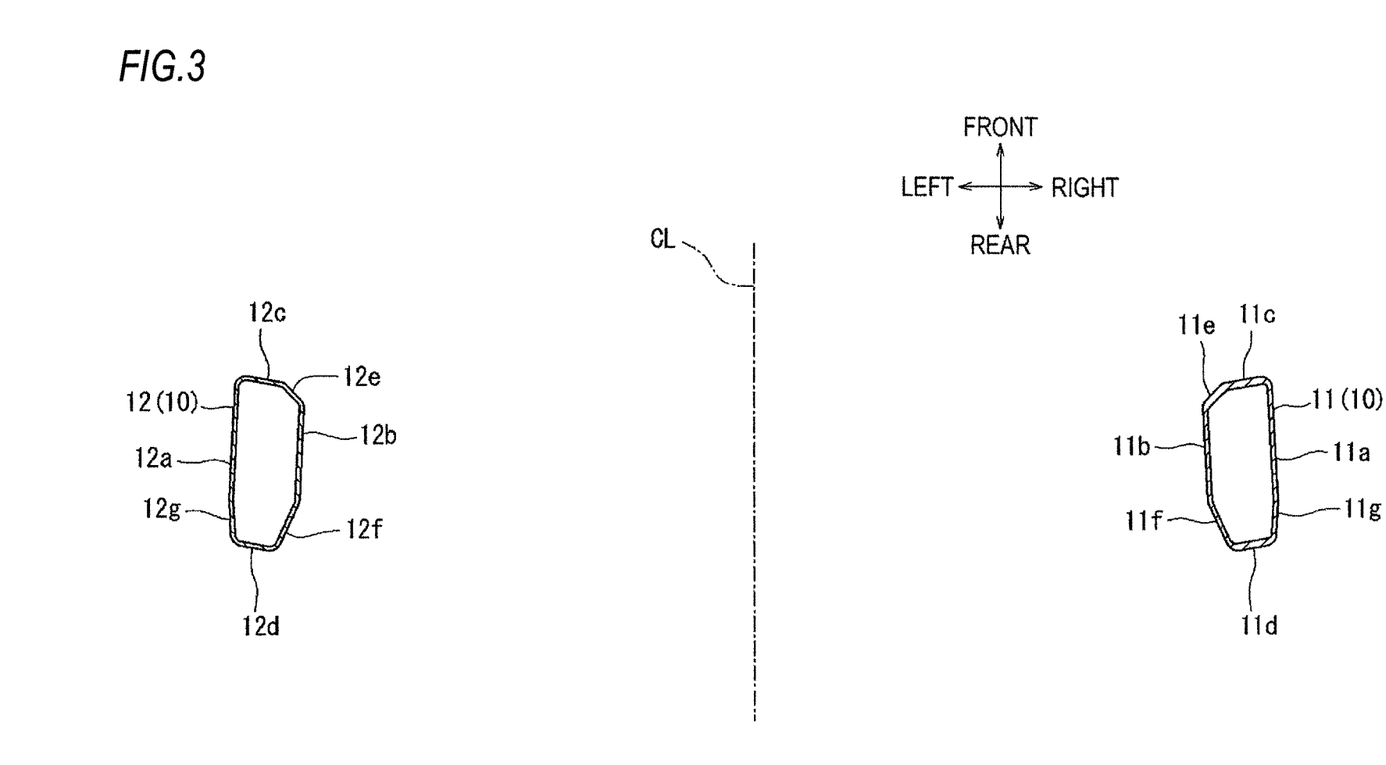
FIG. 3 is an end view taken along the arrow III-III in FIG. 1.
Figure 4:
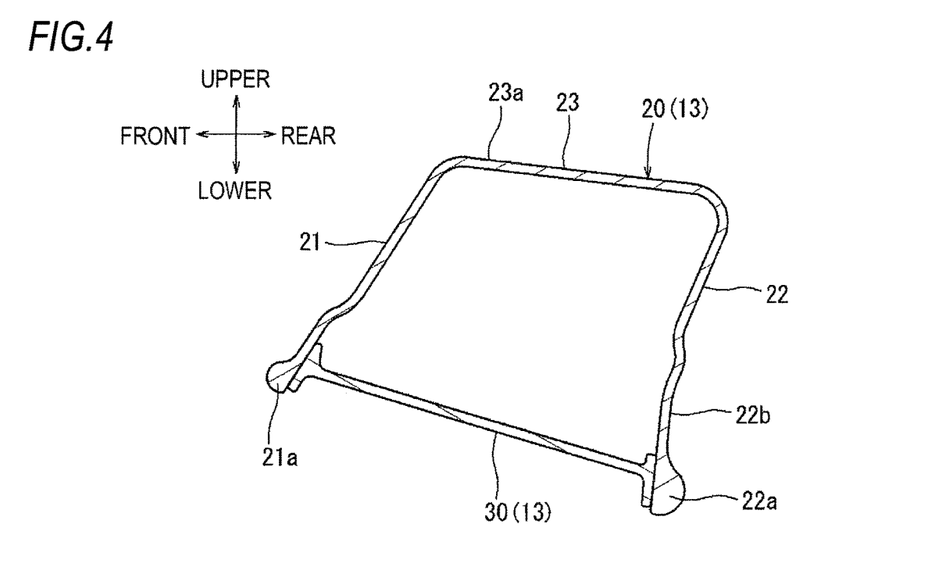
FIG. 4 is an end view taken along the arrow IV-IV in FIG. 1.
Figure 5:
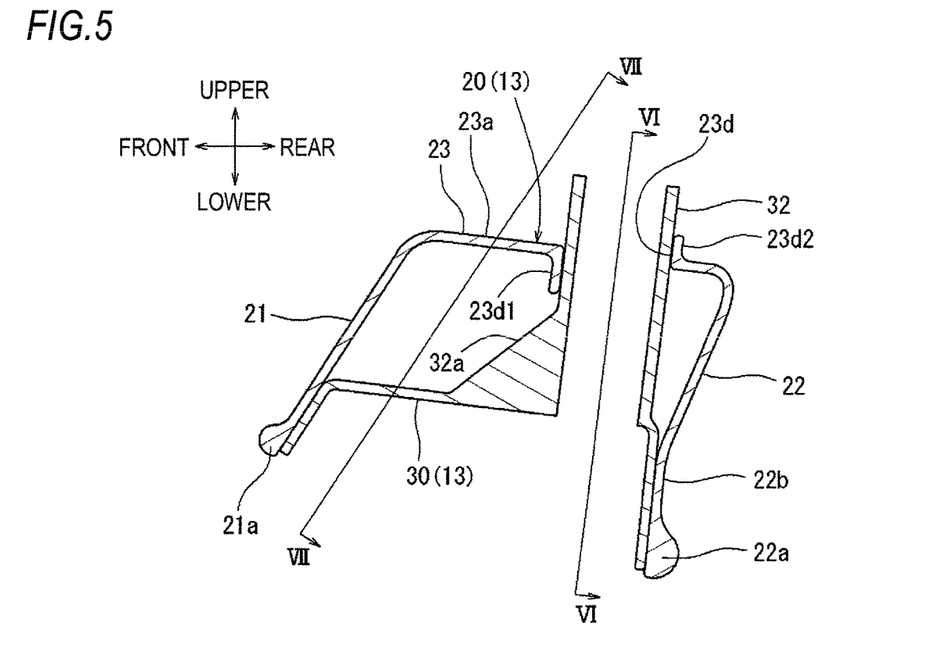
FIG. 5 is an end view taken along the arrow V-V in FIG. 1.
Figure 6:
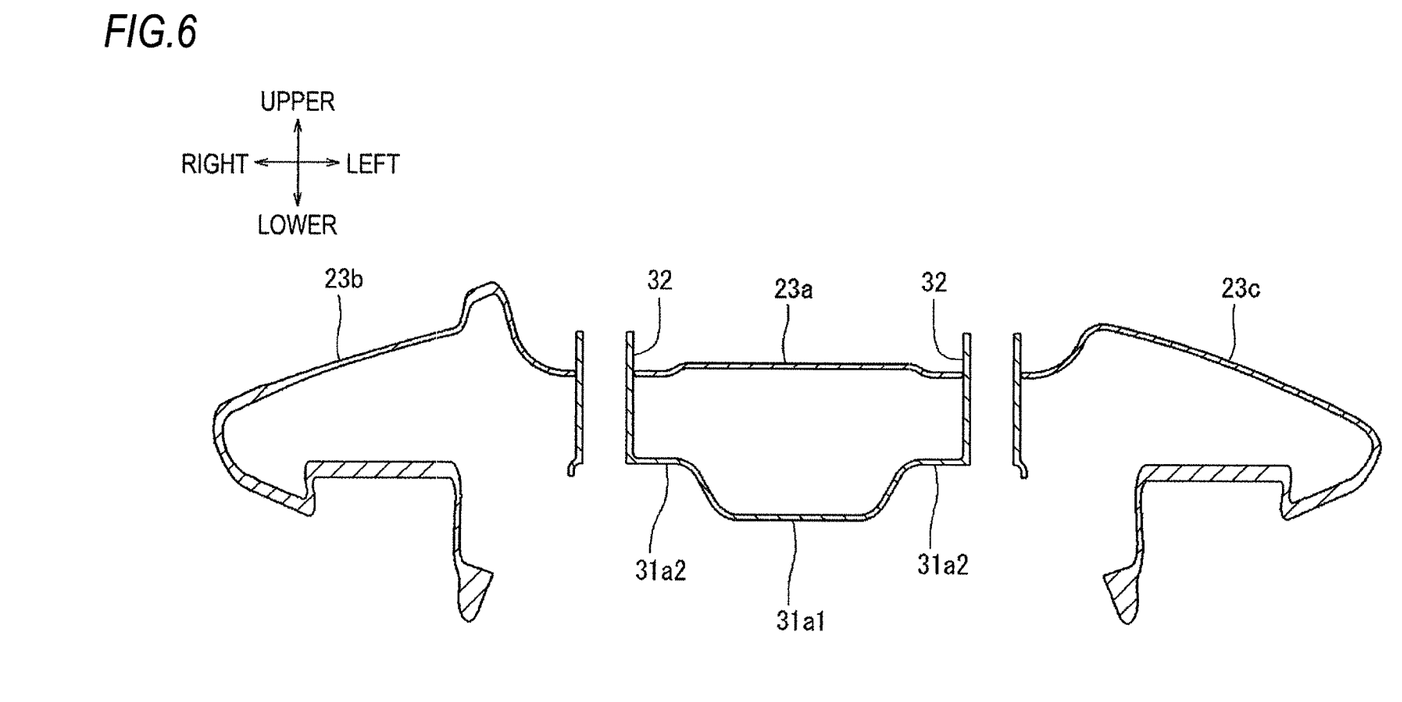
FIG. 6 is an end view taken along the arrow VI-VI in FIG. 5.
Figure 7:
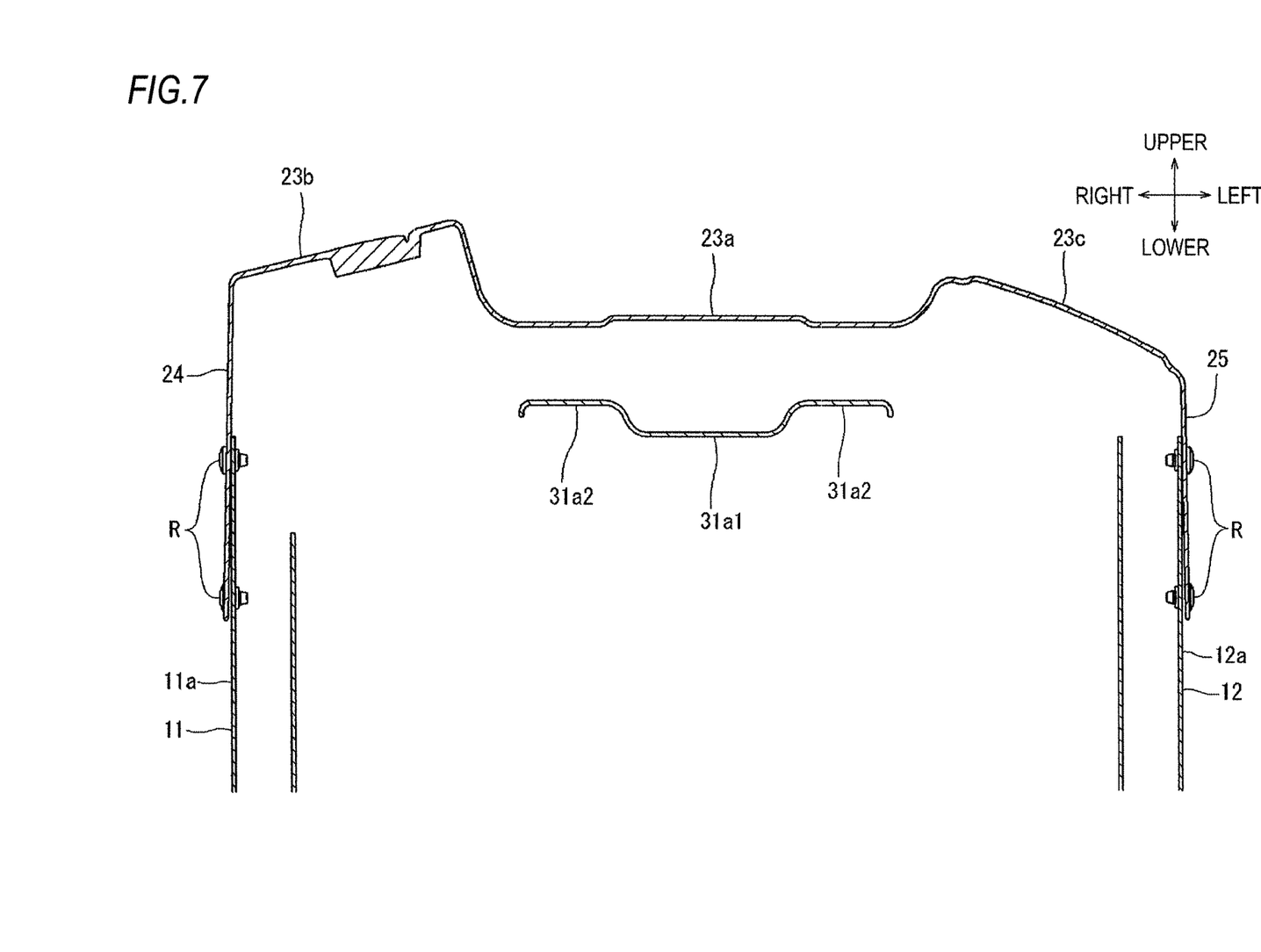
FIG. 7 is an end view taken along the arrow VII-VII in FIG. 5.

The right side frame 11 is made of an extruded material of an aluminum alloy having a sectional shape shown in FIG. 3, as a base. In FIG. 3, a cross section of the right side frame 11 has a deformed heptagonal shape. The right side frame 11 has a right surface portion 11a, a left surface portion 11b, a front surface portion 11c, a rear surface portion 11d, a front left chamfered portion 11e, a rear left chamfered portion 11f, and a rear right chamfered portion 11g. The right surface portion 11a and the left surface portion 11b extend in parallel with each other while being inclined slightly toward the left (seat inside direction) with respect to a seat front and rear direction. The front surface portion 11c and the rear surface portion 11d extend in parallel with each other while being inclined slightly toward the rear with respect to a seat left and right direction. The front left chamfered portion 11e is a portion extending so as to connect a left end portion of the front surface portion 11c and a front end portion of the left surface portion 11b and has an inclination angle of about 45 degrees with respect to the left surface portion 11b. The rear left chamfered portion 11f is a portion extending so as to connect a left end portion of the rear surface portion 11d and a rear end portion of the left surface portion 11b and has an inclination angle of about 30 degrees with respect to the left surface portion 11b. The rear right chamfered portion 11g is a portion extending so as to connect a right end portion of the rear surface portion 11d and a rear end portion of the right surface portion 11a and has an inclination angle of about 5 degrees with respect to the right surface portion 11a.

The left side frame 12 is made of an extruded material of an aluminum alloy having a sectional shape shown in FIG. 3, as a base. In FIG. 3, a cross section of the left side frame 12 has a deformed heptagonal shape. The left side frame 12 has a left surface portion 12a, a right surface portion 12b, a front surface portion 12c, a rear surface portion 12d, a front right chamfered portion 12e, a rear right chamfered portion 12f, and a rear left chamfered portion 12g. The left surface portion 12a and the right surface portion 12b extend in parallel with each other while being inclined slightly toward the right (seat inside direction) with respect to the seat front and rear direction. The front surface portion 12c and the rear surface portion 12d extend in parallel with each other while being inclined slightly toward the rear with respect to the seat left and right direction. The front right chamfered portion 12e is a portion extending so as to connect a right end portion of the front surface portion 12c and a front end portion of the right surface portion 12b and has an inclination angle of about 45 degrees with respect to the right surface portion 12b. The rear right chamfered portion 12f is a portion extending so as to connect a right end portion of the rear surface portion 12d and a rear end portion of the right surface portion 12b and has an inclination angle of about 30 degrees with respect to the right surface portion 12b. The rear left chamfered portion 12g is a portion extending so as to connect a left end portion of the rear surface portion 12d and a rear end portion of the left surface portion 12a and has an inclination angle of about 5 degrees with respect to the left surface portion 12a.

As shown in FIG. 3, an outline of the cross-sectional shape of the right side frame 11 and an outline of the cross-sectional shape of the left side frame 12 are in line symmetry with respect to a centerline CL of the back frame 10 in the left and right direction. Further, the thickness of the right surface portion 11a and the left surface portion 11b of the right side frame 11 is substantially equal to the thickness of the left surface portion 12a and the right surface portion 12b of the left side frame 12. On the other hand, the thickness of the front surface portion 11c and the rear surface portion 11d of the right side frame 11 is approximately twice the thickness of the front surface portion 12c and the rear surface portion 12d of the left side frame 12. The reason is that a belt guide portion 23b for guiding a seat belt is disposed on an upper side of the right side frame 11, and thus, a larger bending force in the front and rear direction is applied to the right side frame 11 than the left side frame 12, and thus, the geometrical moment of inertia of the right side frame 11 should be further increased in order to counteract the above situation. As shown in FIGS. 1 and 2, the right side frame 11 and the left side frame 12 are formed by making the extruded material having a constant section bent in a convex shape toward the front in the vicinity of the central portion in the up and down direction. Further, an upper arm 15 that is a press part made of iron is attached to the lower end side of the right side frame 11. The upper arm 15 is a part formed as one part by combining two parts in a hollow shape. An upper side portion of the upper arm 15 is formed as a side frame connection portion 15a so that an internal line of a horizontal section corresponds to an outline of the cross-sectional shape of the right side frame 11. Further, a lower side portion of the upper arm 15 is formed as a flat plate-like recliner connection portion 15b and has recliner connection holes 15b1 formed therein. The lower end side of the right side frame 11 is fastened and connected by four rivets R in a state of being inserted into the side frame connection portion 15a of the upper arm 15. A recliner connection portion 12h is formed on a lower end side of the left side frame 12. The recliner connection portion 12h is configured such that the front surface portion 12c is expanded toward the front and recliner connection holes 12a1 for attaching a recliner are provided in the left surface portion 12a.

Figure 9:
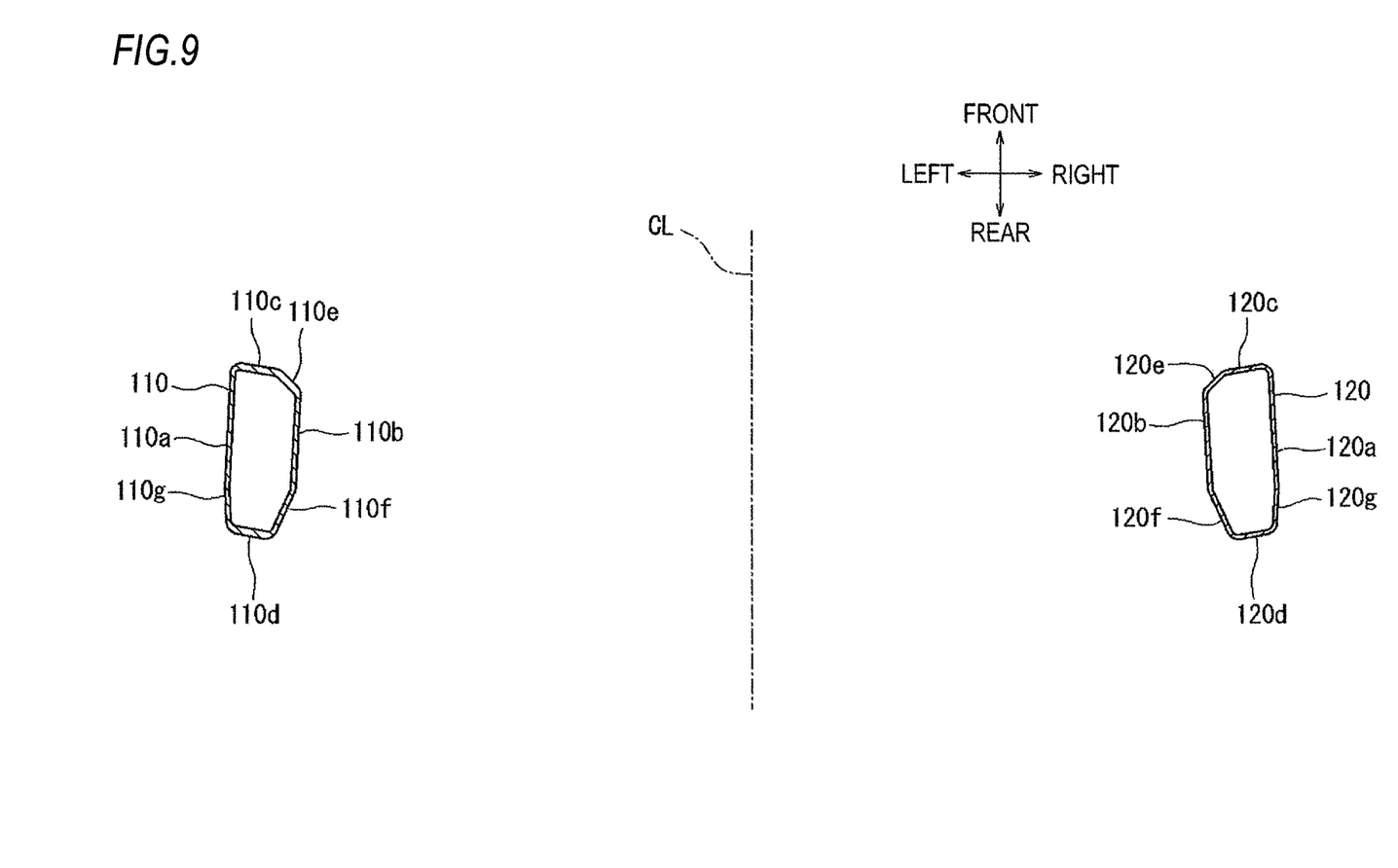
FIG. 9 is an end view corresponding to FIG. 3, showing a back frame of a left automobile seat.

FIG. 9 is a view corresponding to FIG. 3, showing sectional shapes of a right side frame 120 and a left side frame 110 of a left automobile seat. The sectional shapes shown in FIG. 9 have a relationship in which the left and right of the sectional shapes shown in FIG. 3 are exchanged with respect to the centerline CL in the left and right direction. That is, each of the surface portions 11a to 11f of the right side frame 11 of the right automobile seat corresponds to each of surface portions 110a to 110f of the left side frame 110 of the left automobile seat, respectively. Further, each of the surface portions 12a to 12f of the left side frame 12 of the right automobile seat corresponds to each of surface portions 120a to 120f of the right side frame 120 of the left automobile seat, respectively. In this way, the right side frame 11 and the left side frame 110 can be used by making the extruded material of the aluminum alloy having the same section upside down. Further, the left side frame 12 and the right side frame 120 can be used by making the extruded material of the aluminum alloy having the same section upside down. That is, the side frames of the left and right automobile seats can be formed of the extruded materials of two kinds of aluminum alloys. Meanwhile, in the left automobile seat, the right side frame 120 and the left side frame 110 correspond to the "second side frame" and the "first side frame" in the claims, respectively.

As shown in FIGS. 1, 2 and 4 to 7, the upper frame 13 includes a main body part 20 having a substantially inverted U-shaped cross section and opened downward, and a lid member 30 that is attached to a central portion on a lower opening side of the main body part 20 so as to cover the opening. The main body part 20 is a molded article of a fiber-reinforced composite resin, which is obtained by curing a plurality of laminated carbon fiber fabrics with a matrix resin of epoxy resin. The main body part 20 has a front wall portion 21, a rear wall portion 22, an upper wall portion 23, a right wall portion 24, and a left wall portion 25.

The upper wall portion 23 has a central portion 23a located at the center in the left and right direction, a belt guide portion 23b located on the right end side, and a pedestal portion 23c located on the left end side. The central portion 23a is a surface portion which is substantially horizontal in a standard state where the back frame 10 stands up against a rear portion of a cushion frame and which extends in a direction substantially perpendicular to holder portions 32 described later. At bilaterally symmetrical positions of the central portion 23a with respect to a center plane in the left and right direction, a pair of holder insertion holes 23d is provided to penetrate in the up and down direction. At the central portion 23a of a peripheral edge portion of each holder insertion hole 23d, a front standing wall portion 23d1 for mainly supporting the front surface portion side of each holder portion 32 is erected downwardly, and a rear standing wall portion 23d2 for mainly supporting the rear surface portion side of each holder portion 32 is erected upwardly. Specifically, the front standing wall portion 23d1 is disposed in a substantially inverted U-shape in a plan view and extends from a front side portion to both side portions of the peripheral edge portion of each holder insertion hole 23d. The rear standing wall portion 23d2 is disposed in a substantially inverted U-shape in a plan view and extends from a rear side portion to both side portions of the peripheral edge portion of each holder insertion hole 23d. The belt guide portion 23b is a mountain-shape portion which is raised upwardly and has a ridge line inclined downward to the right in the left and right direction. The belt guide portion 23b functions to guide a webbing (not shown) of a seat belt device released from a webbing take-up device (not shown) disposed inside a seat back from a back surface of the back frame 10 to a front surface of an upper body of a seated occupant. The pedestal portion 23c is a trapezoidal portion protruding slightly upward with respect to the central portion 23a and is intended to form the shape of a shoulder portion of the seat back. The belt guide portion 23b and the pedestal portion 23c can be selectively formed on the left and right by attaching or detaching an insert portion (not shown) with respect to a molding die of the upper frame 13. That is, the portion formed in a state where the insert portion (not shown) is attached to the molding die of the upper frame 13 is the pedestal portion 23c, and the portion formed in a state where the insert portion is not attached thereto is the belt guide portion 23b. In the main body part 20 of the left automobile seat, the belt guide portion 23b is disposed on the left end side and the pedestal portion 23c is disposed on the right end side. That is, the belt guide portion 23b is disposed on an outer side of an automobile in both the right seat and the left seat.

The front wall portion 21 extends forward and downward while forming an obtuse angle relative to the central portion 23a of the upper wall portion 23. Further, the front wall portion 21 extends substantially parallel to the front surface portion 11c and the front surface portion 12c on the upper sides of the right side frame 11 and the left side frame 12 when the upper frame 13 is connected to the right side frame 11 and the left side frame 12. A thick portion 21a for increasing the rigidity of an end portion is provided at a lower end portion of the front wall portion 21. The rear wall portion 22 extends substantially parallel to the rear surface portion 11d and the rear surface portion 12d on the upper sides of the right side frame 11 and the left side frame 12 when the upper frame 13 is connected to the right side frame 11 and the left side frame 12. That is, the front wall portion 21 and the rear wall portion 22 extend forward and downward substantially in parallel with each other. A connection surface portion 22b is formed at the portion of the rear wall portion 22 corresponding to the central portion 23a of the upper wall portion 23. A lower side portion of the connection surface portion 22b extends downward substantially perpendicular to the upper wall portion 23, and a rear wall surface portion 31c of the lid member 30 described later is connected to the connection surface portion 22b. A thick portion 22a for increasing the rigidity of an end portion is provided at a lower end portion of the rear wall portion 22. Right end portions of the upper wall portion 23, the front wall portion 21 and the rear wall portion 22 are connected by the right wall portion 24, and left end portions of the upper wall portion 23, the front wall portion 21 and the rear wall portion 22 are connected by the left wall portion 25, thereby forming the substantially box-shaped main body part 20 opened downward.

Figure 8:
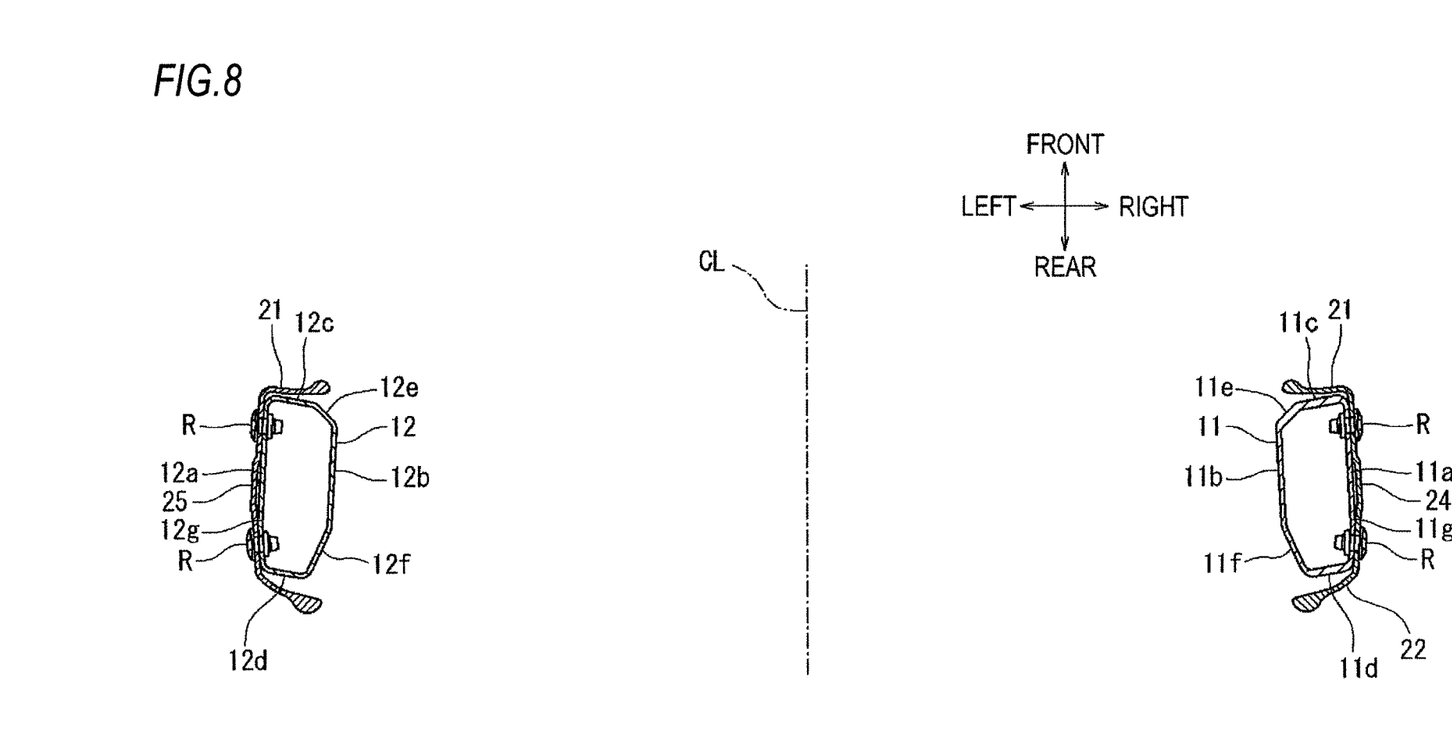
FIG. 8 is an end view taken along the arrow VIII-VIII in FIG. 1.

As shown in FIG. 8, when the upper frame 13 is put on the upper end sides of the right side frame 11 and the left side frame 12 from above, the left surface of the right wall portion 24 is formed to be abutted against the right surfaces of the right surface portion 11a and the rear right chamfered portion 11g of the right side frame 11. Further, when the upper frame 13 is put on the upper end sides of the right side frame 11 and the left side frame 12 from above, the right surface of the left wall portion 25 is formed to be abutted against the left surfaces of the left surface portion 12a and the rear left chamfered portion 12g of the left side frame 12. Meanwhile, by referring to FIG. 9, the left surface of the right wall portion 24 can be also abutted against the right surfaces of the right surface portion 120a and the rear right chamfered portion 120g of the right side frame 120 of the left automobile seat. Further, the right surface of the left wall portion 25 can be also abutted against the left surfaces of the left surface portion 110a and the rear left chamfered portion 110g of the left side frame 110 of the left automobile seat.

As shown in FIGS. 2 and 4 to 7, the lid member 30 is a die-cast molded article of aluminum. The lid member 30 includes a base portion 31 having a substantially rectangular shape in a plan view, and a pair of rectangular tubular holder portions 32 standing on the rear sides of the left and right end portions of the base portion 31. The base portion 31 has an upper wall surface portion 31a, a front wall surface portion 31b, and a rear wall surface portion 31c. A concave surface portion 31a1 is provided at the central portion in the left and right direction of the upper wall surface portion 31a. Convex portions 31a2 each raised in a trapezoidal shape are provided on both left and right sides of the concave surface portion 31a1. A holder portion 32 is respectively provided on the rear side of each convex surface portion 31a2. An inner cylinder portion of each holder portion 32 penetrates in the up and down direction so that a headrest support 40 can be inserted thereinto. A bracing wall 32a for stably holding each holder portion 32 with respect to each convex portion 31a2 is provided between the front surface portion of each holder portion 32 and each convex portion 31a2.

As shown in FIGS. 2 and 4 to 7, the lid member 30 is assembled to the main body part 20 in a state where the upper end sides of the pair of holder portions 32 are respectively inserted into a pair of holder insertion holes 23d of the main body part 20 from below. Specifically, in a state where each holder portion 32 is exposed from an upper surface of the central portion 23a by about ⅓ of the up and down direction length from its upper end, a lower end side of the front wall portion 21 of the main body part 20 is abutted against the front wall surface portion 31b of the lid member 30 and fastened and fixed thereto by two rivets R. Further, in the same state, the connection surface portion 22b of the rear wall portion 22 of the main body part 20 is abutted against the rear wall surface portion 31c of the lid member 30 and fastened and fixed thereto by two rivets R. In this way, the lid member 30 is fixed to the front wall portion 21 and the rear wall portion 22 corresponding to the central portion 23a of the upper wall portion 23 of the main body part 20, thereby forming a closed section structure. At this time, the pair of holder portions 32 of the lid member 30 is mainly supported from the front and rear by the front standing wall portion 23d1 and the rear standing wall portion 23d2 of the main body part 20, respectively.

As shown in FIGS. 1 and 2, the lower frame 14 has a substantially U shape in a front view. The lower frame 14 is a molded article of a fiber-reinforced composite resin, which is obtained by curing a plurality of laminated carbon fiber fabrics with a matrix resin of epoxy resin. The lower frame 14 includes a main body portion 14a, a right connection portion 14b, and a left connection portion 14c. The right connection portion 14b is disposed on the right side of the main body portion 14a and is a connection portion to be connected to the lower end side of the right side frame 11 and the upper arm 15. The left connection portion 14c is a connection portion to be connected to the lower end side of the left side frame 12. Ribs (not shown) are provided in the main body portion 14a, thereby increasing rigidity. The right connection portion 14b is formed in a substantially U shape in which a cross section cut along a horizontal plane opens forward. The right connection portion 14b has a right surface portion 14b1, a rear surface portion 14b2, and a left surface portion 14b3 which correspond to the rear right chamfered portion 11g, the rear surface portion 11d, and the rear left chamfered portion 11f of the right side frame 11, respectively. The left connection portion 14c is formed in a substantially U shape in which the cross section cut along the horizontal plane opens forward. The left connection portion 14c has a left surface portion 14c1, a rear surface portion 14c2, and a right surface portion 14c3 which correspond to the rear left chamfered portion 12g, the rear surface portion 12d, and the rear right chamfered portion 12f of the left side frame 12, respectively. Further, by referring to FIG. 9, in the back frame 10 of the left automobile seat, the right surface portion 14b1, the rear surface portion 14b2, and the left surface portion 14b3 correspond to the rear right chamfered portion 120g, the rear surface portion 120d, and the rear left chamfered portion 120f of the right side frame 120, respectively. Further, the left surface portion 14c1, the rear surface portion 14c2, and the right surface portion 14c3 correspond to the rear left chamfered portion 110g, the rear surface portion 110d, and the rear right chamfered portion 110f of the left side frame 110, respectively. That is, the lower frame 14 can be used in both the back frame 10 of the right automobile seat and the back frame 10 of the left automobile seat.

As shown in FIGS. 1 to 3 and 7, the upper frame 13 is put on the upper end portions of the right side frame 11 and the left side frame 12 from above. In this state, the right wall portion 24 and the left wall portion 25 of the upper frame 13 are respectively abutted against the right surface portion 11a and the rear right chamfered portion 11g of the right side frame 11 and the left surface portion 12a and the rear left chamfered portion 12g of the left side frame 12 and are fastened and fixed thereto by four rivets R. Next, in a state where the upper arm 15 is attached to the lower end side of the right side frame 11, the right connection portion 14b of the lower frame 14 is put thereon from behind. Then, the rear right chamfered portion 11g of the right side frame 11 and the right surface portion 14b1 of the lower frame 14 are abutted against each other and fastened and fixed by four rivets R. Further, in the same state, the rear left chamfered portion 11f of the right side frame 11 and the left surface portion 14b3 of the lower frame 14 are abutted against each other and fastened and fixed by three rivets R. Next, the left connection portion 14c of the lower frame 14 is put on the lower end side of the left side frame 12 from behind. Then, the rear left chamfered portion 12g of the left side frame 12 and the left surface portion 14c1 of the lower frame 14 are abutted against each other and fastened and fixed by three rivets R. Further, in the same state, the rear right chamfered portion 12f of the left side frame 12 and the right surface portion 14c3 of the lower frame 14 are abutted against each other and fastened and fixed by three rivets R. In this way, the left side frame 12, the right side frame 11, the upper frame 13, and the lower frame 14 are connected to form the substantially rectangular back frame 10, as seen in a front view. Meanwhile, the back frame 10 is configured such that the recliner connection portion 15b of the upper arm 15 and the recliner connection portion 12h of the left side frame 12 are attached to the rear end side of a seat cushion frame (not shown) via recliners (not shown), respectively.

The present embodiment configured as described above has the following operational effects. Since the outline shape of the cross section of the right side frame 11 and the outline shape of the cross section of the left side frame 12 are in line symmetry with respect to the centerline of the back frame in the left and right direction, both the right side frame 11 and the left side frame 12 are selectively attached to the left and right of the same upper frame 13. In this way, the same upper frame can be used even when the mounting sides of the right side frame 11 and the left side frame 12 in the left and right automobile seats are different at the left and right. Further, since the geometrical moment of inertia of the cross section of the right side frame 11 is larger than the geometrical moment of inertia of the cross section of the left side frame 12, at least a part of the surface portions constituting the right side frame 11 is thicker than the corresponding surface portions constituting the left side frame 12. In this way, the bending rigidity of the right side frame 11 can be made higher than the bending rigidity of the left side frame 12. That is, it is possible to provide a structure in which the bending strength of the right and left side frames 11, 12 is different from each other while suppressing an increase in the kind of the upper frame 13.

In addition, the bending load applied from the webbing of the seat belt device to the right side frame 11 mainly acts to bend the right side frame 11 in the left and right direction. In this way, the geometrical moment of inertia of the cross section of the right side frame 11 about the axis extending in the left and right direction can be made larger than the geometrical moment of inertia of the cross section of the left side frame 12 about the axis extending in the left and right direction, so that it is possible to efficiently increase the bending rigidity of the back frame 10. In other words, since it is not required to increase the rigidity of the left side frame 12 more than necessary, an increase in weight can be suppressed. Further, the cross sections of the right side frame 11 and the left side frame 12 are formed in the closed section of a deformed heptagonal shape by extrusion molding. In this way, it is possible to efficiently increase the bending rigidity of the right side frame 11 and to firmly attach the right side frame 11 and the left side frame 12 to the upper frame 13 while suppressing the rotation thereof.

Furthermore, the front surface portion 11c and the rear surface portion 11d, which are surface portions in the front and rear direction of the cross section of the right side frame 11, are formed to be thicker than the front surface portion 12c and the rear surface portion 12d, which are surface portions in the front and rear direction of the cross section of the left side frame 12. In this way, it is possible to efficiently increase the bending rigidity of the back frame 10 in the front and rear direction.

Although specific embodiments have been described above, the disclosure is not limited to these appearances and configurations, and various modifications, additions and deletions can be made without changing the spirit of the disclosure. For example, the following can be exemplified.

1. In the above embodiment, the belt guide portion 23b is formed on the right end side of the main body part 20 of the upper frame 13, and the pedestal portion 23c is formed on the left end side thereof. However, the disclosure is not limited thereto. For example, the belt guide portion 23b may be provided on both left and right end sides, respectively. In this case, since the main body part 20 has the same shape at the left seat and the right seat, it is not necessary to distinguish the arrangement position of the belt guide portion 23b by an insert of a forming die.

2. In the above embodiment, the front surface portion 11c and the rear surface portion 11d, which are surface portions in the front and rear direction of the cross section of the right side frame 11, are formed to be thicker than the front surface portion 12c and the rear surface portion 12d, which are surface portions in the front and rear direction of the cross section of the left side frame 12. However, the disclosure is not limited thereto. For example, the other surface portions of the cross section of the right side frame 11 may be formed to be thicker than the other surface portions of the cross section of the left side frame 12, or all of the surface portions of the cross section of the right side frame 11 may be formed to be thicker than all of the surface portions of the cross section of the left side frame 12. Of course, any surface portion of the cross section of the right side frame 11 may be formed to be thicker than any corresponding surface portion of the cross section of the left side frame 12, so long as the geometrical moment of inertia can be increased.

3. In the above embodiment, the upper frame 13 is formed such that the right surface of the right surface portion 11a and the rear right chamfered portion 11g of the right side frame 11 is abutted against the left surface of the right wall portion 24 of the upper frame 13, and the left surface of the left surface portion 12a and the rear left chamfered portion 12g of the left side frame 12 is abutted against the right surface of the left wall portion 25 of the upper frame 13. However, in addition to this, the upper frame 13 may be formed such that the front surface portion 11c and/or the rear surface portion 11d of the right side frame 11 are abutted against the front wall portion 21 and/or the rear wall portion 22 of the upper frame 13, and the front surface portion 12c and/or the rear surface portion 12d of the left side frame 12 are abutted against the front wall portion 21 and/or the rear wall portion 22 of the upper frame 13.

4. In the above embodiment, the main body part 20 is made of fiber-reinforced composite resin, and the lid member 30 is made of aluminum. However, the disclosure is not limited thereto. For example, the main body part 20 may be made of a light alloy such as aluminum or magnesium, and the lid member 30 may be made of fiber-reinforced composite resin such as carbon or glass. In addition, both the main body part 20 and the lid member 30 may be made of iron.

5. In the above embodiment, the disclosure is applied to an automobile seat. However, the disclosure may be applied to a seat to be mounted on a vehicle such as an airplane, a ship or a train.

The disclosure provides illustrative, non-limiting examples as follows:

According to an aspect of the disclosure, there is provided a back frame structure of a vehicle seat, the back frame structure including: first and second side frames that extend in an up and down direction; and an upper frame that connects an upper end side of the first side frame and an upper end side of the second side frame in a bridging manner, wherein the first side frame has a constant cross section, which is a closed section or an opened section with a part of a closed section opened, and the second side frame has a constant cross section, which is a closed section or an opened section with a part of a closed section opened, wherein an outline shape of the cross section of the first side frame and an outline shape of the cross section of the second side frame are in line symmetry with respect to a centerline of the back frame in a left and right direction, and wherein a geometrical moment of inertia of the cross section of the first side frame is larger than a geometrical moment of inertia of the cross section of the second side frame.

Accordingly, the outline shape of the cross section of the first side frame and the outline shape of the cross section of the second side frame are in line symmetry with respect to the centerline of the back frame in the left and right direction. Therefore, both the first side frame and the second side frame are selectively attached to the left and right of the same upper frame. As a result, the same upper frame can be used even when the mounting sides of the first side frame and the second side frame in the left and right automobile seats are different at the left and right. Further, since the geometrical moment of inertia of the cross section of the first side frame is larger than the geometrical moment of inertia of the cross section of the second side frame, at least a part of the surface portions constituting the first side frame is thicker than the corresponding surface portions constituting the second side frame. In this way, the bending rigidity of the first side frame can be made higher than the bending rigidity of the second side frame. That is, it is possible to provide a structure in which the bending strength of the first and second side frames is different from each other while suppressing an increase in the kind of the upper frame.

The geometrical moment of inertia of the cross section of the first side frame about an axis extending in the left and right direction may be larger than the geometrical moment of inertia of the cross section of the second side frame about an axis extending in the left and right direction.

Accordingly, the bending load applied from the webbing of the seat belt device to the first side frame mainly acts to bend the first side frame in the front and rear direction. In this way, the geometrical moment of inertia of the cross section of the first side frame about the axis extending in the left and right direction can be made larger than the geometrical moment of inertia of the cross section of the second side frame about the axis extending in the left and right direction, so that it is possible to efficiently increase the bending rigidity of the back frame. In other words, it is not necessary to increase the rigidity of the second side frame more than necessary The cross sections of the first side frame and the second side frame may be polygonal closed sections.

Accordingly, it is possible to efficiently increase the bending rigidity of the first side frame and to firmly attach the first side frame and the second side frame to the upper frame while suppressing the rotation thereof.

A gap between the outline and an internal line in a front and rear direction of the cross section of the first side frame may be larger than a gap between the outline and an internal line in the front and rear direction of the cross section of the second side frame.

Accordingly, the surface portion located in the front and rear direction of the cross section of the first side frame is formed to be thicker than the surface portion located in the front and rear direction of the cross section of the second side frame. Therefore, it is possible to efficiently increase the bending rigidity of the back frame in the front and rear direction.

What is claimed is:

1. A back frame structure of a vehicle seat, the back frame structure comprising:
   first and second side frames that extend in an up and down direction; and
   an upper frame that connects an upper end side of the first side frame and an upper end side of the second side frame in a bridging manner,
   wherein the first side frame has a constant closed cross section portion extending between a recliner connection region and the upper frame, and the second side frame has a constant closed cross section portion extending between the recliner connection region and the upper frame,
   wherein an outline shape of the cross section of the first side frame and an outline shape of the cross section of the second side frame are in line symmetry with respect to a centerline of the back frame in a left and right direction, and
   wherein a geometrical moment of inertia of the cross section of the first side frame is larger than a geometrical moment of inertia of the cross section of the second side frame.

2. The back frame structure of the vehicle seat according to claim 1,
   wherein the geometrical moment of inertia of the cross section of the first side frame about an axis extending in the left and right direction is larger than the geometrical moment of inertia of the cross section of the second side frame about an axis extending in the left and right direction.

3. The back frame structure of the vehicle seat according to claim 1,
   wherein the cross sections of the first side frame and the second side frame are polygonal closed sections.

4. The back frame structure of the vehicle seat according to claim 3,
   wherein a wall thickness of the first side in a front and rear direction of the cross section of the first side frame is larger than a wall thickness of the second side frame in the front and rear direction of the cross section of the second side frame.

5. The back frame structure of the vehicle seat according to claim 1, wherein the first and second side frames are each extruded structures.

6. The back frame structure of the vehicle seat according to claim 1, wherein the first side frame comprises a wall having wall portions, wherein the wall has a non-uniform thickness.

* * * * *